United States Patent
Atsuta

(10) Patent No.: US 12,234,355 B2
(45) Date of Patent: Feb. 25, 2025

(54) THERMOPLASTIC RESIN COMPOSITION AND MOLDED ARTICLE OF SAME

(71) Applicant: Techno-UMG Co., Ltd., Tokyo (JP)

(72) Inventor: Hiroyuki Atsuta, Tokyo (JP)

(73) Assignee: TECHNO-UMG CO., LTD., Tokyo (JP)

( * ) Notice: Subject to any disclaimer, the term of this patent is extended or adjusted under 35 U.S.C. 154(b) by 141 days.

(21) Appl. No.: 17/295,312

(22) PCT Filed: Nov. 22, 2019

(86) PCT No.: PCT/JP2019/045753
§ 371 (c)(1),
(2) Date: May 19, 2021

(87) PCT Pub. No.: WO2020/105730
PCT Pub. Date: May 28, 2020

(65) Prior Publication Data
US 2022/0010120 A1    Jan. 13, 2022

(30) Foreign Application Priority Data

Nov. 22, 2018   (JP) .................... 2018-219572

(51) Int. Cl.
| | | |
|---|---|---|
| C08L 33/10 | (2006.01) | |
| C08F 20/14 | (2006.01) | |
| C08F 212/08 | (2006.01) | |
| C08F 220/14 | (2006.01) | |
| C08K 5/00 | (2006.01) | |
| C08K 5/3435 | (2006.01) | |
| C08K 5/3492 | (2006.01) | |
| C08L 51/04 | (2006.01) | |

(52) U.S. Cl.
CPC ............ *C08L 33/10* (2013.01); *C08F 212/08* (2013.01); *C08F 220/14* (2013.01); *C08K 5/005* (2013.01); *C08K 5/3435* (2013.01); *C08K 5/3492* (2013.01); *C08L 51/04* (2013.01)

(58) Field of Classification Search
CPC ........ C08L 33/10; C08L 51/04; C08F 220/14; C08F 220/16; C08F 220/18; C08F 212/08
See application file for complete search history.

(56) References Cited

U.S. PATENT DOCUMENTS

| | | | | |
|---|---|---|---|---|
| 2008/0266493 A1* | 10/2008 | Yonezawa | ............ | G02B 5/3083 349/96 |
| 2016/0060446 A1* | 3/2016 | Park | ........ | C08L 25/12 524/100 |
| 2017/0022334 A1* | 1/2017 | Abe | ........ | C08L 33/068 |
| 2017/0327680 A1* | 11/2017 | Shibata | ........ | C08L 33/12 |

FOREIGN PATENT DOCUMENTS

| | | | |
|---|---|---|---|
| CN | 102532769 | A | 7/2012 |
| CN | 105393145 | A | 3/2016 |
| CN | 108137914 | A | 6/2018 |
| EP | 3438142 | A1 | 2/2019 |
| JP | S63-196640 | A | 8/1988 |
| JP | 2000212373 | A * | 8/2000 |
| JP | 2004-346237 | A | 12/2004 |
| JP | 2005-132987 | A | 5/2005 |
| JP | 2005-298748 | A | 10/2005 |
| JP | 2011-032328 | A | 2/2011 |
| JP | 2012-052054 | A | 3/2012 |
| JP | 2015-537090 | A | 12/2015 |
| JP | 2016-117782 | A | 6/2016 |
| JP | 2019-019236 | A | 2/2019 |
| WO | WO-2017/169931 | A1 | 10/2017 |

OTHER PUBLICATIONS

Machine transaltion into English of Wada et a; JP 2000-212373 A (Year: 2000).*
International Search Report for International Patent Application No. PCT/JP2019/045753, dated Feb. 10, 2020 (4 pages).
Office Action for Chinese Patent Application No. 201980076675.5 dated Jul. 4, 2022 (13 pages).
Database WPI Week 200578 Thomson Scientific, London, GB; AN 2005-762460 XP002806810,-& JP 2005 298748 A.
Database WPI Week 201769 Thomson Scientific, London, GB; An 2017-68290P XP002806809,-& WO 2017/169931 A1 (Oct. 5, 2017);-& EP 3438142 A1 (Feb. 6, 2019).
European Search Report for European Patent Application No. 19888130.0 dated Jun. 28, 2022 (9 pages).

* cited by examiner

*Primary Examiner* — Karuna P Reddy
(74) *Attorney, Agent, or Firm* — Wenderoth, Lind & Ponack, L.L.P.

(57) ABSTRACT

The thermoplastic resin composition includes: a (meth) acrylic acid ester copolymer obtained by polymerizing a vinyl monomer mixture containing 50% by mass or more and less than 80% by mass of a (meth)acrylic acid ester monomer and 12-39% by mass of an aromatic vinyl monomer; a hindered amine compound having a molecular weight of 200-1800; and an ultraviolet absorber compound having a maximum absorption wavelength at 250-300 nm. The thermoplastic resin composition optionally includes a graft copolymer, and the hindered amine compound is present in an amount of 0.4-1.8 parts by mass, the ultraviolet absorber compound is present in an amount of 0.1-1.6 parts by mass, and a sum of the amounts of the hindered amine compound and the ultraviolet absorber compound is not more than 2.0 parts by mass, each relative to 100 parts by mass of a combination of the (meth)acrylic acid ester copolymer and the graft copolymer.

4 Claims, No Drawings

THERMOPLASTIC RESIN COMPOSITION AND MOLDED ARTICLE OF SAME

CROSS-REFERENCE TO RELATED APPLICATIONS

This non-provisional application is a national stage entry of International Patent Application No. PCT/JP2019/045753, filed on Nov. 22, 2019, which claims priority to Japanese Patent Application No. 2018-219572, filed on Nov. 22, 2018, the entire contents of each of which are hereby incorporated by reference.

TECHNICAL FIELD

The present invention relates to a thermoplastic resin composition and a molded product thereof.

Priority is claimed on Japanese Patent Application No. 2018-219572, filed Nov. 22, 2018, the contents of which are incorporated herein by reference.

BACKGROUND ART

Molded products produced from resin materials are required to have weatherability such that the molded products are not liable to discoloration even when exposed to direct sunlight.

As a resin composition having excellent weatherability, for example, Patent Document 1 discloses a resin composition containing 0.1 to 8 parts by mass of a specific triazine-based ultraviolet absorber relative to 100 parts by mass of an acrylic resin containing 80% by mass or more of methyl methacrylate as a monomer component.

DESCRIPTION OF PRIOR ART

Patent Document

Patent Document 1: Japanese Unexamined Patent Application Publication No. 2016-117782

DISCLOSURE OF INVENTION

Problems to be Solved by the Invention

When manufacturing a thin molded product aiming at cost reduction or weight reduction, or when manufacturing a molded product with a complicated shape or a large size, the manufacturing is often implemented by injection molding and, hence, the resin composition is required to have excellent flowability.

In addition, since the molding temperature for the molded product is high, gaseous volatile substances are generated from the resin composition during molding, and the generated volatile substances adhere to and accumulate on the mold, resulting in defective appearance of the molded product. Therefore, the resin composition is also required to be less prone to gas generation during molding.

However, the resin composition described in Patent Document 1 does not meet the flowability requirement. Further, the resin composition described in Patent Document 1 does not necessarily sufficiently suppress the gas generation during molding, and the molded product may have defective appearance.

The object of the present invention is to provide a thermoplastic resin composition that not only shows excellent flowability and generates less amount of gas during molding, but also can be used to obtain a molded product having excellent weatherability, and to provide a molded product thereof.

Means to Solve the Problems

The present invention includes the following embodiments.

[1] A thermoplastic resin composition including:
- a (meth)acrylic acid ester copolymer (A) obtained by polymerizing a vinyl monomer mixture (m1) containing a (meth)acrylic acid ester monomer and an aromatic vinyl monomer;
- a hindered amine compound (C) having a molecular weight of 200 to 1800; and
- an ultraviolet absorber compound (D) having a maximum absorption wavelength at 250 to 300 nm, wherein:
- the thermoplastic resin composition optionally includes a graft copolymer (B) obtained by graft-polymerizing a vinyl monomer mixture (m2) in the presence of a rubber polymer (b1),
- the (meth)acrylic acid ester monomer is present in an amount of 50% by mass or more and less than 80% by mass, and the aromatic vinyl monomer is present in an amount of 12 to 39% by mass, each based on a total mass of the vinyl monomer mixture (m1), and
- the hindered amine compound (C) is present in an amount of 0.4 to 1.8 parts by mass, the ultraviolet absorber compound (D) is present in an amount of 0.1 to 1.6 parts by mass, and a sum of the amounts of the hindered amine compound (C) and the ultraviolet absorber compound (D) is not more than 2.0 parts by mass, each relative to 100 parts by mass of a combination of the (meth)acrylic acid ester copolymer (A) and the graft copolymer (B).

[2] The thermoplastic resin composition according to [1] above, wherein:
- the graft copolymer (B) is one obtained by graft-polymerizing 20 to 80% by mass of the vinyl monomer mixture (m2) in the presence of 20 to 80% by mass of the rubber polymer (b1), with the proviso that a sum of amounts of the rubber polymer (b1) and the vinyl monomer mixture (m2) is 100% by mass, and has a graft ratio of 10 to 150%;
- the rubber polymer (b1) is at least one selected from the group consisting of a diene rubber polymer, an acrylic rubber polymer, an olefin rubber polymer, and a silicone rubber polymer; and
- the vinyl monomer mixture (m2) includes 65 to 82% by mass of an aromatic vinyl monomer and 18 to 35% by mass of a vinyl cyanide monomer, based on a total mass of the vinyl monomer mixture (m2).

[3] The thermoplastic resin composition according to [2] above, wherein the rubber polymer (b1) is polybutyl acrylate.

[4] The thermoplastic resin composition according to [2] or [3] above, wherein the vinyl monomer mixture (m2) more preferably contains 70 to 80% by mass of the aromatic vinyl monomer, and 20 to 30% by mass of the vinyl cyanide monomer, and still more preferably contains 73 to 80% by mass of the aromatic vinyl monomer and 20 to 27% by mass of the vinyl cyanide monomer, each based on a total mass of the vinyl monomer mixture (m2).

[5] The thermoplastic resin composition according to [2] to [4] above, wherein the aromatic vinyl monomer contained in the vinyl monomer mixture (m2) is at least one of styrene and α-methylstyrene.

[6] The thermoplastic resin composition according to any one of [2] to [5] above, wherein the vinyl cyanide monomer contained in the vinyl monomer mixture (m2) is at least one of acrylonitrile and methacrylonitrile.

[7] The thermoplastic resin composition according to any one of [2] to [6] above, wherein the proportion of the rubber polymer (b1) is more preferably 25 to 75% by mass, and the proportion of the vinyl monomer mixture (m2) is more preferably 25 to 75% by mass; and the proportion of the rubber polymer (b1) is even more preferably 30 to 70% by mass and the proportion of the vinyl monomer mixture (m2) is even more preferably 30 to 70% by mass, with the proviso that a sum of amounts of the rubber (b1) and the vinyl monomer mixture (m2) is 100% by mass.

[8] The thermoplastic resin composition according to any one of [2] to [7] above, wherein the graft ratio of the graft copolymer (B) is more preferably 20 to 100% by mass, and even more preferably 30 to 80% by mass.

[9] The thermoplastic resin composition according to any one of [1] to [8] above, wherein the volume average particle diameter of the rubber polymer (b1) is preferably 0.1 to 1.0 μm, and more preferably 0.1 to 0.5 μm.

[10] The thermoplastic resin composition according to any one of [1] to [9] above, wherein the proportion of the (meth)acrylic acid ester copolymer (A) is 50 to 90% by mass, and the proportion of the graft copolymer (B) is 10 to 50% by mass, with the proviso that a sum of amounts of the (meth)acrylic acid ester copolymer (A) and the graft copolymer (B) is 100% by mass.

[11] The thermoplastic resin composition of [10] above, wherein the proportion of the (meth)acrylic acid ester copolymer (A) is more preferably 55 to 80% by mass, and the proportion of the graft copolymer (B) is more preferably 20 to 45% by mass; and the proportion of the (meta)acrylic acid ester copolymer (A) is even more preferably 55 to 70% by mass, and the proportion of the graft copolymer (B) is even more preferably 30 to 45% by mass, with the proviso that a sum of amounts of the (meth)acrylic acid ester copolymer (A) and the graft copolymer (B) is 100% by mass.

[12] The thermoplastic resin composition according to any one of [1] to [11] above, wherein the vinyl monomer mixture (m1) further includes an N-substituted maleimide monomer, and the N-substituted maleimide monomer is present in an amount of 1% by mass or more and less than 9% by mass, based on a total mass of the vinyl monomer mixture (m1).

[13] The thermoplastic resin composition according to [12] above, wherein the N-substituted maleimide monomer is present in an amount of preferably 3 to 8.5% by mass, and more preferably 5 to 8% by mass, based on a total mass of the vinyl monomer mixture (m1).

[14] The thermoplastic resin composition according to [12] or [13] above, wherein the N-substituted maleimide monomer contained in the vinyl monomer mixture (m1) is at least one selected from the group consisting of N-phenylmaleimide, N-(2-methylphenyl)maleimide, N-(4-hydroxyphenyl)maleimide, and N-chlorophenylmaleimide.

[15] The thermoplastic resin composition according to any one of [1] to [14] above, wherein the amount of the (meth)acrylic acid ester monomer is preferably 60 to 79% by mass, and more preferably 70 to 78% by mass, based on the total mass of the vinyl monomer mixture (m1).

[16] The thermoplastic resin composition according to any one of [1] to [15] above, wherein the amount of the aromatic vinyl monomer is preferably 13 to 35% by mass, and more preferably 15 to 30% by mass, based on the total mass of the vinyl monomer mixture (m1).

[17] The thermoplastic resin composition according to any one of [1] to [16] above, wherein the (meth)acrylic acid ester monomer contained in the vinyl monomer mixture (m1) is at least one selected from the group consisting of methyl acrylate, methyl methacrylate and ethyl methacrylate.

[18] The thermoplastic resin composition according to an one of [1] to [17] above, wherein the aromatic vinyl monomer contained in the vinyl monomer mixture (m1) is at least one of styrene and α-methylstyrene.

[19] The thermoplastic resin composition according to [17] or [18] above, wherein the vinyl monomer mixture (m1) contains methyl methacrylate and styrene.

[20] The thermoplastic resin composition according to [19] above, wherein the vinyl monomer mixture (m1) further contains N-phenylmaleimide.

[21] The thermoplastic resin composition according to any one of [1] to [20] above, wherein the copolymer (A) preferably has a mass average molecular weight of 10,000 to 300,000, and more preferably 50,000 to 150,000.

[22] The thermoplastic resin composition according to any one of [1] to [21] above, wherein the glass transition temperature of the copolymer (A) is preferably 100 to 160° C., and more preferably 105 to 145° C.

[23] The thermoplastic resin composition according to any one of [1] to [22] above, wherein the hindered amine compound (C) is at least one of bis(2,2,6,6-tetramethyl-4-piperidyl) sebacate and tetrakis(2,2,6,6-tetramethyl-4-piperidyl)-1,2,3,4-butanetetracarboxylate.

[24] The thermoplastic resin composition according to any one of [1] to [23] above, wherein the ultraviolet absorber compound (D) is at least one selected from the group consisting of 2-(4,6-diphenyl-1,3,5-triazine-2-yl)-5[2-(2-ethylhexanoyloxy)ethoxy] phenol, 2-[4,6-bis(2,4-dimethylphenyl)-1,3,5-triazine-2-yl]-5-(octyloxy)-phenol, 2-(4,6-diphenyl-1,3,5-triazine-2-yl)-5-(hexyloxy) phenol, and [2-hydroxy-4-(octyloxy)phenyl](phenyl) methanone.

[25] The thermoplastic resin composition according to [24] above, wherein the ultraviolet absorber compound (D) is 2-(4,6-diphenyl-1,3,5-triazine-2-yl)-5[2-(2-ethylhexanoyloxy)ethoxy]phenol.

[26] The thermoplastic resin composition according to any one of [1] to [25] above, wherein the amount of the hindered amine compound (C) is 0.4 to 1.2 parts by mass, relative to 100 parts by mass of a combination of the (meth)acrylic acid ester copolymer (A) and the graft copolymer (B).

[27] The thermoplastic resin composition according to any one of [1] to [26] above, wherein the amount of the ultraviolet absorber compound (D) is 0.2 to 0.8 parts by mass, relative to 100 parts by mass of a combination of the (meth)acrylic acid ester copolymer (A) and the graft copolymer (B).

[28] The thermoplastic resin composition according to any one of [1] to [27] above, wherein a sum of the amounts of the hindered amine compound (C) and the ultraviolet absorber compound (D) is 0.5 to 2.0 parts by mass, relative to 100 parts by mass of a combination of the (meth)acrylic acid ester copolymer (A) and the graft copolymer (B).

[29] The thermoplastic resin composition according to any one of [1] to [28] above, which has a melt volume rate (MVR) of 10 cm$^3$/10 min or more, as measured under a load of 98 N (10 kg) at 220° C. according to ISO 1133 standard.

[30] The thermoplastic resin composition according to any one of [1] to [29] above, which has a discoloration degree (ΔE) of not more than 5 as measured before and after subjecting a molded product 1 to a weatherability test, wherein the molded product 1 has a length of 100 mm, a width of 100 mm and a thickness of 3 mm, and is obtained by molding the thermoplastic resin composition using an injection molding machine under conditions of a cylinder set temperature of 260° C. and a mold temperature of 30° C., and the weatherability test is performed by exposing the molded product 1 to environment with a temperature of 63° C. and a cycle condition of 60 minutes (rainfall: 12 minutes) for 2,000 hours.

[31] The thermoplastic resin composition according to any one of [1] to [30] above, wherein an amount of gas adhering to a mold (gas adhesion amount) is less than 0.30 mg when the thermoplastic resin composition is molded into 50 pieces of molded product (2) each having a length of 100 mm, a width of 50 mm, and a thickness of 3 mm using an injection molding machine under conditions of a cylinder set temperature of 260° C., a mold temperature of 30° C., and a short shot condition with a resin filling amount reduced to about ⅔ of an internal volume of the mold.

[32] A molded product using the thermoplastic resin composition of any one of [1] to [31] above.

Effect of the Invention

The thermoplastic resin composition of the present invention not only shows excellent flowability and generates less amount of gas during molding, but also can be used to obtain a molded product having excellent weatherability.

Further, the molded product of the present invention has excellent weatherability.

DESCRIPTION OF THE EMBODIMENTS

Hereinbelow, the present invention will be described in detail.

In the following description, the "molded product" is a product obtained by molding the thermoplastic resin composition of the present invention.

Further, in the present specification, acrylic acid and methacrylic acid are collectively referred to as "(meth) acrylic acid".

[Thermoplastic Resin Composition]

The thermoplastic resin composition according to the first aspect of the present invention includes a (meth)acrylic acid ester copolymer (A), a hindered amine compound (C), and an ultraviolet absorber compound (D), which are described below. The thermoplastic resin composition may contain, if necessary, at least one of a graft copolymer (B), another thermoplastic resin, and an additive, which are described below, as long as the effects of the present invention are not impaired.

The details of the components are described below.

<(Meth)acrylic Acid Ester Copolymer (A)>

The (meth)acrylic acid ester copolymer (A) (hereinafter, also referred to simply as "copolymer (A)") is a copolymer obtained by polymerizing a vinyl monomer mixture (m1) containing a (meth)acrylic acid ester monomer and an aromatic vinyl monomer.

That is, the copolymer (A) is a copolymer of at least a (meth)acrylic acid ester monomer and an aromatic vinyl monomer, and includes a (meth)acrylic acid ester monomer unit and an aromatic vinyl monomer unit.

The vinyl monomer mixture (m1) may contain a N-substituted maleimide monomer, or monomers other than a (meth)acrylic acid ester monomer, an aromatic vinyl monomer, and a N-substituted maleimide monomer (hereinafter, also referred to as "other monomers"), depending on the physical properties required of the molded product.

Concerning the copolymer (A), it is not always easy to identify how the (meth)acrylic acid ester monomer, the aromatic vinyl monomer and the like are polymerized. That is, there exists a situation (impossible/impractical situation) which makes it impossible or almost impractical to directly specify the copolymer (A) in terms of its structure or properties. Therefore, in the present invention, it is more appropriate to define the copolymer (A) as "obtained by polymerizing a vinyl monomer mixture (m1) containing a (meth)acrylic acid ester monomer and an aromatic vinyl monomer".

((Meth)acrylic Acid Ester Monomer)

Examples of the (meth)acrylic acid ester monomer include acrylic acid esters such as methyl acrylate, ethyl acrylate, n-propyl acrylate, i-propyl acrylate, n-butyl acrylate, i-butyl acrylate, t-butyl acrylate, amyl acrylate, isoamyl acrylate, octyl acrylate, 2-ethylhexyl acrylate, decyl acrylate, lauryl acrylate, stearyl acrylate, cyclohexyl acrylate, pentyl acrylate, phenyl acrylate, benzyl acrylate and the like; and methacrylic acid esters such as methyl methacrylate, ethyl methacrylate, n-propyl methacrylate, propyl methacrylate, n-butyl methacrylate, i-butyl methacrylate, t-butyl methacrylate, amyl methacrylate, isoamyl methacrylate, octyl methacrylate, 2-ethylhexyl methacrylate, decyl methacrylate, lauryl methacrylate, cyclohexyl methacrylate, benzyl methacrylate, phenyl methacrylate, and the like. Among these, methyl acrylate, methyl methacrylate and ethyl methacrylate are preferable, and methyl methacrylate and ethyl methacrylate are more preferable, from the viewpoint of increasing the surface hardness and color development of the molded product.

One of these (meth)acrylic acid ester monomers may be used alone, or two or more thereof may be used in combination.

The amount of the (meth)acrylic acid ester monomer is 50% by mass or more and less than 80% by mass, preferably 60 to 79% by mass, and more preferably 70 to 78% by mass, based on the total mass of the vinyl monomer mixture (m1). When the amount of the (meth)acrylic acid ester monomer is not less than the above lower limit value, the weatherability of the molded product is enhanced. When the amount of the (meth)acrylic acid ester monomer is less than the above upper limit value, the aromatic vinyl monomer can be sufficiently blended in the vinyl monomer mixture (m1), so that the thermoplastic resin composition can maintain good flowability.

(Aromatic Vinyl Monomer)

Examples of the aromatic vinyl monomer include styrene, α-methylstyrene, o-, m- or p-methylstyrene, vinylxylene, p-t-butylstyrene, ethylstyrene and the like. Among these, styrene and α-methylstyrene are preferable, and styrene is more preferable, from the viewpoint of further improving the flowability of the thermoplastic resin composition and improving the color development and impact resistance of the molded product.

One of these aromatic vinyl monomers may be used alone, or two or more thereof may be used in combination.

The amount of the aromatic vinyl monomer is 12 to 39% by mass, preferably 13 to 35% by mass, and more preferably 15 to 30% by mass, based on the total mass of the vinyl monomer mixture (m1). When the amount of the aromatic vinyl monomer is not less than the above lower limit value, the flowability of the thermoplastic resin composition is enhanced. When the amount of the aromatic vinyl monomer is not more than the above upper limit value, the (meth) acrylic acid ester monomer can be sufficiently blended in the vinyl monomer mixture (m1), so that the molded product can maintain good weatherability.

(N-Substituted Maleimide Monomer)

Examples of the N-substituted maleimide monomer include N-substituted alkyl maleimides such as N-methylmaleimide, N-ethylmaleimide, N-n-propylmaleimide, N-i-propylmaleimide, N-n-butylmaleimide, N-i-butylmaleimide, and N-t-butylmaleimide; N-substituted cycloalkylmaleimides such as N-cyclohexylmaleimide; N-substituted arylmaleimides such as N-phenylmaleimide, N-(2-methylphenyl) maleimide, N-(4-hydroxyphenyl) maleimide, and N-chlorophenylmaleimide; N-aralkylmaleimide, and the like. Among these, N-substituted arylmaleimides are preferable, and N-phenylmaleimide is more preferable, from the viewpoint of further improving the heat resistance and impact resistance of the molded product.

One of these N-substituted maleimide monomers may be used alone, or two or more thereof may be used in combination.

The amount of the N-substituted maleimide monomer is preferably 1% by mass or more and less than 9% by mass, more preferably 3 to 8.5% by mass, and even more preferably 5 to 8% by mass, based on the total mass of the vinyl monomer mixture (m1). When the amount of the N-substituted maleimide monomer is not less than the above lower limit value, the heat resistance of the molded product improves. When the amount of the N-substituted maleimide monomer is not more than the above upper limit value, the flowability of the thermoplastic resin composition can be favorably maintained.

(Other Monomers)

The other monomers are not particularly limited as long as such monomers is copolymerizable with the (meth)acrylic acid ester monomer and the aromatic vinyl monomer, and examples thereof include a vinyl cyanide monomer, an acid group-containing monomer, and the like.

Examples of the vinyl cyanide monomer include acrylonitrile and methacrylonitrile.

Examples of the acid group-containing monomer include (meth)acrylic acid, itaconic acid, and crotonic acid.

One of these other monomers may be used alone, or two or more thereof may be used in combination.

The amount of the other monomers is preferably 10% by mass or less, and more preferably 5% by mass or less, based on the total mass of the vinyl monomer mixture (m1). When the amount of the other monomers is not more than the above upper limit value, the effect of the present invention can be achieved more easily.

(Method for Producing Copolymer (A))

The copolymer (A) is produced by a known method such as bulk polymerization, solution polymerization, bulk suspension polymerization, suspension polymerization, emulsion polymerization, miniemulsion polymerization and the like. Among these, emulsion polymerization and miniemulsion polymerization are preferable from the viewpoint of easy control of the particle size of the copolymer (A), and suspension polymerization and bulk polymerization are preferable from the viewpoint of increasing the heat resistance of the molded product.

For producing the copolymer (A) by the emulsion polymerization method, for example, the production can be implemented by a method in which the vinyl monomer mixture (m1), an emulsifier, a polymerization initiator and a chain transfer agent are charged into a reactor and heated to perform polymerization, and the formed copolymer (A) is recovered from the resulting aqueous dispersion containing the copolymer (A) by a precipitation method.

Examples of the emulsifier include ordinary emulsifiers for emulsion polymerization (an alkylbenzene sulfonate, a dipotassium alkenyl succinate, potassium rosinate, etc.).

Examples of the polymerization initiator include an azo polymerization initiator, a photopolymerization initiator, an inorganic peroxide, an organic peroxide, and a redox initiator in which an organic peroxide, a transition metal, and a reducing agent are combined.

Examples of the chain transfer agent include mercaptans such as octyl mercaptan, n- or t-dodecyl mercaptan, n-hexadecyl mercaptan, n- or t-tetradecyl mercaptan; α-methylstyrene dimer; terpenes, and the like.

Examples of the precipitation method include a method in which a precipitant is added to the aqueous dispersion, followed by heating and stirring; the precipitant is separated; and the precipitated copolymer (A) is washed with water, dehydrated and dried. Examples of the precipitant include aqueous solutions of sulfuric acid, acetic acid, calcium chloride, magnesium sulfate and the like.

For producing the copolymer (A) by the suspension polymerization method, for example, the production can be implemented by a method in which the vinyl monomer mixture (m1), a suspension dispersant, a dispersion aid, a polymerization initiator and a chain transfer agent are charged into a reactor and heated to perform polymerization, followed by cooling, washing, filtration and drying, to thereby recover the formed copolymer (A).

Examples of the suspension dispersant include anionic water-soluble polymers such as poly(meth)acrylic acid and poly(meth)acrylate; nonionic water-soluble polymers such as polyvinyl alcohol, methyl cellulose, and polyvinyl pyrrolidone; poorly water-soluble inorganic salts such as barium sulfate, tricalcium phosphate, and magnesium carbonate.

Examples of the dispersion aid include a carboxylate, an alkyl sulfate ester salt, sodium alkylbenzene sulfonate, sodium alkyl sulfosuccinate, sodium polyoxyethylene nonylphenyl ether sulfate, and the like.

Examples of the polymerization initiator and chain transfer agent include those polymerization initiator and chain transfer agent that are usable in the emulsion polymerization method.

(Properties of Copolymer (A))

The weight average molecular weight of the copolymer (A) is preferably from 10,000 to 300,000, more preferably from 50,000 to 150,000. When the mass average molecular weight of the copolymer (A) is not less than the above lower limit value, the impact resistance of the molded article improves. When the mass average molecular weight of the copolymer (A) is not more than the above upper limit value, the flowability of the thermoplastic resin composition further improves.

The mass average molecular weight of the copolymer (A) is measured by the following method.

The copolymer (A) is stirred in acetone, the acetone-soluble fraction is dissolved in tetrahydrofuran (THF), and the resulting solution is introduced into a gel permeation chromatography (GPC) apparatus for measurement. The molecular weight of the acetone-soluble fraction is measured using a calibration curve prepared using standard polystyrene having a known molecular weight, and a mass average molecular weight is obtained.

The glass transition temperature of the copolymer (A) is preferably 100 to 160° C., and more preferably 105 to 145° C. When the glass transition temperature of the copolymer (A) is not less than the above lower limit value, the heat resistance of the molded product improves. When the glass transition temperature of the copolymer (A) is not more than the above upper limit value, the flowability of the thermoplastic resin composition further improves.

The glass transition temperature of the copolymer (A) is a value determined by differential scanning calorimetry (DSC). Specifically, the glass transition temperature is one observed when the temperature is raised from 35° C. to 250° C. at a heating rate of 10° C./min in a nitrogen atmosphere, lowered to 35° C., and then raised again to 250° C.

<Graft Copolymer (B)>

The graft copolymer (B) is a copolymer obtained by graft-polymerizing a vinyl monomer mixture (m2) in the presence of a rubber polymer (b1).

That is, the graft copolymer (B) is composed of a rubber polymer (b1) segment and a polymer (b2) segment formed by polymerizing the vinyl monomer mixture (m2).

With respect to the graft copolymer (B), it is difficult to specify how the vinyl monomer mixture (m2) is polymerized on the rubber polymer (b1). For example, the polymer (b2) includes those bonded to the rubber polymer (b1) and those not bonded to the rubber polymer (b1). It is also difficult to specify the molecular weight of the polymer (b2) bound to the rubber polymer (b1), the ratio of the constituent units, and the like. That is, there is a situation (impossible/impractical situation) which makes it impossible or almost impractical to directly specify the graft copolymer (B) in terms of its structure or properties. Therefore, in the present invention, it is appropriate to define the graft copolymer (B) as "obtained by graft-polymerizing a vinyl monomer mixture (m2) in the presence of a rubber polymer (b1)".

(Rubber Polymer (b1))

Examples of the rubber polymer (b1) include diene rubber polymers, such as a butadiene rubber polymer (polybutadiene, styrene-butadiene copolymer, acrylonitrile-butadiene copolymer, acrylic acid ester-butadiene copolymer, etc.), a conjugated diene rubber polymer (isoprene rubber, chloroprene rubber, styrene-isoprene copolymer, etc.); acrylic rubber polymers, such as butyl polyacrylate; olefin rubber polymers, such as ethylene-propylene copolymer; silicone rubber polymers, such as polyorganosiloxane; natural rubbers, butyl rubbers, urethane rubbers, chlorinated polyethylene, epichlorohydrin rubbers, fluororubbers, polysulfide rubbers, and the like. Among these, a diene rubber polymer, an acrylic rubber polymer, an olefin rubber polymer, and a silicone rubber polymer are preferable because the resulting molded product excels in weatherability. In particular, an acrylic rubber polymer is preferable in that the weatherability of the molded product further improves and the affinity of the graft copolymer (B) with respect to the copolymer (A) increases.

As the rubber polymer (b1), one type thereof may be used alone, or two or more types thereof may be used in combination.

The volume average particle diameter of the rubber polymer (b1) is preferably 0.1 to 1.0 μm, and more preferably 0.1 to 0.5 μm. When the volume average particle diameter of the rubber polymer (b1) is not less than the above lower limit value, the impact resistance of the molded product improves. When the volume average particle diameter is not more than the above upper limit value, the color development of the molded product improves.

The volume average particle diameter of the rubber polymer (b1) is a value calculated from the particle size distribution obtained by measuring the volume-based particle size distribution using a laser diffraction or scattering type particle size distribution measuring device.

The method for producing the rubber polymer (b1) is not particularly limited. For example, the rubber polymer (b1) can be obtained by polymerizing monomers such as butadiene or (meth)acrylic acid ester.

(Vinyl Monomer Mixture (m2))

Examples of the monomer contained in the vinyl monomer mixture (m2) include an aromatic vinyl monomer, a vinyl cyanide monomer, a (meth)acrylic acid ester monomer, and a N-substituted maleimide monomer.

Examples of these aromatic vinyl monomer, vinyl cyanide monomer, (meth)acrylic acid ester monomer, and N-substituted maleimide monomer include the vinyl monomer, vinyl cyanide monomer, (meth)acrylic acid ester monomer, and N-substituted maleimide monomer which are listed above in the description of the copolymer (A).

As the monomer forming the graft copolymer (B), it is preferable to use an aromatic vinyl monomer and a vinyl cyanide monomer in combination from the viewpoint of improving the mechanical properties and solvent resistance of the molded product.

The amount of the aromatic vinyl monomer is preferably 65 to 82% by mass, more preferably 70 to 80% by mass, and even more preferably 73 to 80% by mass, based on the total mass of the vinyl monomer mixture (m2). When the amount of the aromatic vinyl monomer is within the above range, the color development and impact resistance of the molded product are enhanced.

The amount of the vinyl cyanide monomer is preferably 18 to 35% by mass, more preferably 20 to 30% by mass, and even more preferably 20 to 27% by mass, based on the total mass of the vinyl monomer mixture (m2). When the amount of the vinyl cyanide monomer is within the above range, the color development and impact resistance of the molded product are enhanced.

(Method for Producing Graft Copolymer (B))

The graft copolymer (B) is obtained by graft-polymerizing the vinyl monomer mixture (m2) in the presence of the rubber polymer (b1).

Examples of the polymerization method include known polymerization methods, such as an emulsion polymerization method, a solution polymerization method, a suspension polymerization method, and a bulk polymerization method. Among these, an emulsion polymerization method is preferable in that the reaction can be controlled so as to proceed stably. Specific examples of the polymerization method include a method in which the vinyl monomer mixture (m2) is charged at once into a latex of the rubber polymer (b1) and then polymerized; a method in which a part of the vinyl monomer mixture (m2) is added to the latex of the rubber polymer (b1) in advance, and the rest of the vinyl monomer mixture (m2) is dropped onto the polymerization system while allowing the polymerization to proceed; a method in which the polymerization is implemented while dropping the entire amount of the vinyl monomer mixture (m2) onto the latex of the rubbery polymer (b1). The polymerization of the vinyl monomer mixture (m2) may be carried out in a single stage or may be divided into two or more stages. When the polymerization is divided into two or more stages, it is also possible to change the type and composition ratio of the vinyl monomer mixture (m2) in each stage.

The emulsion polymerization is usually carried out using a radical polymerization initiator and an emulsifier. For example, the vinyl monomer mixture (m2) is added to a latex of the rubber polymer (b1) containing the rubber polymer (b1), water, and an emulsifier, and the vinyl monomer mixture (m2) is radically polymerized in the presence of a radical polymerization initiator.

When implementing the radical polymerization, any of various known chain transfer agents may be added in order to control the molecular weight and graft ratio of the obtained graft copolymer (B).

Examples of the emulsifier, the radical polymerization initiator, and the chain transfer agent include those emulsifier, radical polymerization initiator, and chain transfer agent which are listed above in the description of the method for producing the copolymer (A).

The polymerization conditions for the radical polymerization may be, for example, at 50 to 100° C. for 1 to 10 hours.

With respect to the proportions of the rubber polymer (b1) and the vinyl monomer mixture (m2), it is preferable that the proportion of the rubber polymer (b1) is 20 to 80% by mass and the proportion of the vinyl monomer mixture (m2) is 20 to 80% by mass, it is more preferable that the proportion of the rubber polymer (b1) is 25 to 75% by mass and the proportion of the vinyl monomer mixture (m2) is 25 to 75% by mass, and it is even more preferable that the proportion of the rubber polymer (b1) is 30 to 70% by mass and the proportion of the vinyl monomer mixture (m2) is 30 to 70% by mass, with the proviso that a sum of amounts of the rubber (b1) and the vinyl monomer mixture (m2) is 100% by mass. When the proportions of the rubber polymer (b1) and the vinyl monomer mixture (m2) are within the above ranges, the productivity of the graft copolymer (B) is good, and the color development and impact resistance of the molded product improve as well.

The graft copolymer (B) obtained by the emulsification polymerization method is usually in the form of a latex.

Examples of the method for recovering the graft copolymer (B) from the latex of the graft copolymer (B) include a wet method in which the latex of the graft copolymer (B) is put into hot water with a coagulant dissolved therein to thereby coagulate the graft copolymer into a slurry; and a spray-drying method in which the latex of the graft copolymer (B) is sprayed into a heated atmosphere to thereby semi-directly recover the graft copolymer (B).

Examples of the coagulant used in the wet method include inorganic acids such as sulfuric acid, hydrochloric acid, phosphoric acid and nitric acid; and metal salts such as calcium chloride, calcium acetate and aluminum sulfate, which are selected in view of the emulsifier used in the polymerization.

(Properties of Graft Copolymer (B))

The graft ratio of the graft copolymer (B) is preferably 10 to 150%, more preferably 20 to 100%, and still more preferably 30 to 80%. When the graft ratio of the graft copolymer (B) is not less than the above lower limit value, the impact resistance, color development and gloss of the molded product improve. When the graft ratio of the graft copolymer (B) is not more than the above upper limit value, the flowability of the thermoplastic resin composition further improves.

Specifically, the graft ratio of the graft copolymer (B) can be measured as follows. That is, the graft copolymer (B) is added to acetone, heat-refluxed at 65 to 70° C. for 3 hours, and the resulting acetone suspension is centrifuged at 14,000 rpm to separate the suspension into a precipitate (acetone insoluble fraction) and acetone solution (acetone-soluble fraction). Next, the acetone-insoluble fraction is dried, the mass of the dried acetone-insoluble fraction is measured, and the graft ratio of the graft copolymer (B) is obtained by the following formula (1). In the formula (1), Y is the mass (g) of the acetone insoluble fraction after drying. X is the total mass (g) of the graft copolymer (B) used for determining Y. The rubber fraction is the amount ratio of the rubber polymer (b1) of the graft copolymer.

$$\text{Graft ratio}(\%) = \{(Y - X \times \text{rubber fraction})/(X \times \text{rubber fraction})\} \times 100 \quad (1)$$

<Hindered Amine Compound (C)>

The molecular weight of the hindered amine compound (C) is 200 to 1800. When the molecular weight of the hindered amine compound (C) is not less than the above lower limit value, the gas generation during molding can be suppressed. When the molecular weight of the hindered amine compound (C) is not more than the above upper limit value, the weatherability of the molded product improves.

Examples of the hindered amine compound (C) include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl) sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl) di(tridecyl)-1,2,3,4-butanetetracarboxylate, bis(1,2,2,6,6-pentamethyl-4-piperidyl) di(tridecyl)-1,2,3,4-butanetetracarboxylate, bis(1,2,2,4,4-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidinol/diethyl succinate polycondensation product, 1,6-bis(2,2,6,6-tetramethyl-4-piperidinylamino)hexane/2,4-dichloro-6-morpholino-s-triazine polycondensation product, 1,6-bis(2,2,6,6-tetramethyl-4-piperidylamino)hexane/2,4-dichloro-6-tert-octylamino-s-triazine polycondensation product, 1,5,8,12-tetrakis[2,4-bis(N-butyl-N-(2,2,6,6-tetramethyl-4-piperidyeamino)-s-triazin-6-yl]-1,5,8,12-tetraazadodecane, 1,5,8,12-tetrakis[2,4-bis(N-butyl-N-(1,2,2,6,6-pentamethyl-4-piperidyl) amino)-s-triazine-6-yl]-1,5,8-12-tetraazadodecane, 1,6,11-tris[2,4-bis(N-butyl-N-(2,2,6,6-tetramethyl-4-piperidyl)amino)-s-triazine-6-yl]aminoundecane, 1,6,11-tris[2,4-bis(N-butyl-N-(1,2,2,6,6-pentamethyl-4-piperidyl) amino)-s-triazine-6-yl] aminoundecane, bis{4-(1-octyloxy-2,2,6,6-tetramethyl)piperidyl}decandionate, bis{4-(2,2,6,6-tetramethyl-1-undecyloxy)piperidyl}carbonato and the like. Among these, since the weatherability of the molded product further improves, bis(2,2,6,6-tetramethyl-4-piperidyl) sebacate and tetrakis(2,2,6,6-tetramethyl-4-piperidyl)-1,2,3,4-butanetetracarboxylate are preferable.

One of these hindered amine compounds (C) may be used alone, or two or more thereof may be used in combination.

<Ultraviolet Absorber Compound (D)>

The ultraviolet absorber compound (D) is an absorbent having a maximum absorption wavelength at 250 to 300 nm. The maximum absorption wavelength at 250 to 300 nm shown by the ultraviolet absorber compound (D) allows for production of a molded product having excellent weatherability even if the copolymer (A) has an aromatic vinyl monomer unit such as styrene.

Specifically, the maximum absorption wavelength can be measured as follows. That is, the ultraviolet absorber compound (D) is dissolved in a solvent that can dissolve the compound (D) (for example, trichloromethane), the absorption spectrum in the wavelength region of 200 to 450 nm is measured by an ultraviolet-visible spectrophotometer, and a wavelength at which the absorbance is maximized is determined as the maximum absorption wavelength.

Examples of the ultraviolet absorber compound (D) include 2-(4,6-diphenyl-1,3,5-triazine-2-yl)-5[2-(2-ethylhexanoyloxy)ethoxy]phenol, 2-[4,6-bis(2,4-dimethylphenyl)-1,3,5-triazine-2-yl]-5-(octyloxy)-phenol, 2-(4,6-diphenyl-1,3,5-triazine-2-yl)-5-(hexyloxy) phenol, and [2-hydroxy-4-(octyloxy)phenyl](phenyl) methanone. Of these, 2-(4,6-diphenyl-1,3,5-triazine-2-yl)-5[2-(2-ethylhexanoyloxy)ethoxy]phenol is preferable because the weatherability of the molded product improves.

One of these ultraviolet absorber compounds (D) may be used alone, or two or more of them may be used in the form of a mixture thereof.

<Optional Components>

If necessary, the thermoplastic resin composition may contain a resin (other thermoplastic resin) other than the copolymer (A) and the graft copolymer (B) or any of various additives as long as the effects of the present invention are not impaired.

Examples of other thermoplastic resins include acrylonitrile-styrene copolymer (AS resin), acrylonitrile-α-methylstyrene copolymer (αSAN resin), styrene-maleic anhydride copolymer, acrylonitrile-styrene-N-substituted maleimide ternary copolymer, styrene-maleic anhydride-N-substituted maleimide ternary copolymer, polycarbonate resin, polybutylene terephthalate (PBT resin), polyethylene terephthalate (PET resin), polyvinyl chloride, polyolefins such as polyethylene and polypropylene, styrene elastomers such as styrene-butadiene-styrene (SBS), styrene-butadiene (SBR), hydrogenated SBS and styrene-isoprene-styrene (SIS), various olefin elastomers, various polyester elastomers, polystyrene, polyacetal resin, modified polyphenylene ether (modified PPE resin), ethylene-vinyl acetate copolymer, polyphenylene sulfide (PPS resin), polyether sulfone (PES resin), polyetheretherketone (PEEK resin), polyarylate, liquid crystal polyester resin, and polyamide (for example, nylon).

One of these other thermoplastic resins may be used alone, or two or more thereof may be used in combination.

Examples of additives include antioxidants, plasticizers, mold release agents, lubricants, dyes, pigments, antistatic agents, flame retardants, inorganic fillers, metal powders and the like.

One of these additives may be used alone, or two or more of these additives may be used in combination.

<Amount of Each Component>

The respective amounts of the components contained in the thermoplastic resin composition are as follows.

The amount of the hindered amine compound (C) is 0.4 to 1.8 parts by mass, preferably 0.4 to 1.2 parts by mass, and more preferably 0.4 to 1.0 parts by mass, relative to 100 parts by mass of a combination of the copolymer (A) and the graft copolymer (B). When the amount of the hindered amine compound (C) is not less than the above lower limit value, the weatherability of the molded product improves. When the amount of the hindered amine compound (C) is not more than the above upper limit value, the gas generation during molding can be suppressed.

The amount of the ultraviolet absorber compound (D) is 0.1 to 1.6 parts by mass, preferably 0.2 to 0.8 parts by mass, and more preferably 0.2 to 0.5 parts by mass, relative to 100 parts by mass of a combination of the copolymer (A) and the graft copolymer (B). When the amount of the ultraviolet absorber compound (D) is not less than the above lower limit value, the weatherability of the molded product improves. When the amount of the ultraviolet absorber compound (D) is not more than the above upper limit value, the gas generation during molding can be suppressed.

The sum of amounts of the hindered amine compound (C) and the ultraviolet absorber compound (D) is not more than 2.0 parts by mass, preferably 0.5 to 2.0 parts by mass, and more preferably 0.5 to 1.4 parts by mass, relative to 100 parts by mass of a combination of the copolymer (A) and the graft copolymer (B). When the sum of amounts of the hindered amine compound (C) and the ultraviolet absorber compound (D) is not less than the above lower limit value, the weatherability of the molded product improves. When the sum of amounts of the hindered amine compound (C) and the ultraviolet absorber compound (D) is not more than the above upper limit value, the gas generation during molding can be suppressed.

With respect to the proportions of the copolymer (A) and the graft copolymer (B) when the thermoplastic resin composition contains the graft copolymer (B), it is preferable that the proportion of the copolymer (A) is 50 to 90% by mass and the proportion of the graft copolymer (B) is 10 to 50% by mass, it is more preferable that the proportion of the copolymer (A) is 55 to 80% by mass and the proportion of the graft copolymer (B) is 20 to 45% by mass, and it is even more preferable that the proportion of the copolymer (A) is 55 to 70% by mass and the proportion of the graft copolymer (B) is 30 to 45% by mass, with the proviso that a sum of amounts of the (meth)acrylic acid ester copolymer (A) and the graft copolymer (B) is 100% by mass. When the proportion of the graft copolymer (B) is within the above range, the color development of the molded product can be enhanced without interfering with the effects of the present invention.

The amount of the copolymer (A) is preferably 49 to 99.5% by mass, more preferably 55 to 99% by mass, even more preferably 70 to 98.5% by mass, particularly preferably 85 to 98% by mass, and most preferably 90 to 97.5% by mass, based on the total mass of the thermoplastic resin composition.

When the thermoplastic resin composition contains the graft copolymer (B), the amount of the copolymer (B) is preferably 10 to 49% by mass, more preferably 15 to 45% by mass, and even more preferably 20 to 40% by mass, based on the total mass of the thermoplastic resin composition.

The amount of the copolymer (C) is preferably 0.3 to 1.76% by mass, and more preferably 0.35 to 1.75% by mass, based on the total mass of the thermoplastic resin composition.

The amount of the copolymer (D) is preferably 0.08 to 1.56% by mass, and more preferably 0.09 to 1.55% by mass, based on the total mass of the thermoplastic resin composition.

When the thermoplastic resin composition contains an optional component, the amount of the optional component is preferably 20% by mass or less, and more preferably 10% by mass or less, based on the total mass of the thermoplastic resin composition. The amount of the optional component is preferably 25.5 parts by mass or less, more preferably 11.5 parts by mass or less, even more preferably 5 parts by mass or less, and particularly preferably 1.5 parts by mass or less, relative to 100 parts by mass of a combination of the copolymer (A) and the graft copolymer (B).

<Method for Producing Thermoplastic Resin Composition>

The thermoplastic resin composition is obtained, for example, by a method in which the copolymer (A), the hindered amine compound (C), the ultraviolet absorber compound (D), and, if necessary, the graft copolymer (B) or the optional components are mixed, and the obtained mixture is melt-kneaded.

For mixing, for example, a mixer such as a Henschel mixer, a V-type blender, or a tumbler mixer can be used.

For melt-kneading, for example, a melt-kneader such as a single-screw extruder, a twin-screw extruder, a Banbury mixer, a pressure kneader, or a mixing roll can be used.

After melt-kneading, the obtained melt-kneaded product is preferably cooled and then pelletized using a pelletizer or the like.

The production of the thermoplastic resin composition may be implemented in either batch-wise manner or continuous manner. Further, the mixing order of the components is not particularly limited as long as all the components are mixed sufficiently uniformly.

<Technical Effects>

The thermoplastic resin composition according to the first aspect of the present invention described above contains the copolymer (A) containing a specific amount of an aromatic vinyl monomer unit in addition to a specific amount of a (meth)acrylic acid ester monomer unit, whereby thermoplastic resin composition shows excellent flowability. Specifically, the melt volume rate (MVR) of the thermoplastic resin composition as measured under a load of 98 N (10 kg) at 220° C. according to the ISO 1133 standard is preferably 10 $cm^3$/10 min or more, more preferably 12 $cm^3$/10 min or more, and even more preferably 15 $cm^3$/10 min or more. The higher the MVR, the better the flowability.

Incidentally, an aromatic vinyl monomer such as styrene easily absorbs light having a wavelength of around 300 nm. Therefore, the copolymer (A) containing an aromatic vinyl monomer unit is liable to resin deterioration due to discoloration and the like.

However, the thermoplastic resin composition according to the first aspect of the present invention contains the ultraviolet absorber compound (D) having a maximum absorption wavelength at 250 to 300 nm. Since the ultraviolet absorber compound (D) absorbs light having a wavelength around 300 nm, the absorption of the light by styrene is suppressed, so that resin deterioration can be prevented.

In addition, since the thermoplastic resin composition according to the first aspect of the present invention contains the hindered amine compound (C) having a molecular weight of 200 to 1800, the weatherability of the molded product improves by the synergistic effect of the hindered amine compound (C) and the ultraviolet absorber compound (D). Specifically, the discoloration degree ($\Delta E$) is preferably not more than 5, more preferably not more than 4, and even more preferably not more than 3, as measured before and after subjecting a molded product 1 to a weatherability test, wherein the molded product 1 has a length of 100 mm, a width of 100 mm and a thickness of 3 mm, and is obtained by molding the thermoplastic resin composition using an injection molding machine under conditions of a cylinder set temperature of 260° C. and a mold temperature of 30° C., and the weatherability test is performed by exposing the molded product 1 to environment with a temperature of 63° C. and a cycle condition of 60 minutes (rainfall: 12 minutes) for 2000 hours. The smaller the value of $\Delta E$, the better the weatherability.

The effect of improving the weatherability of the molded product tends to increase as the amount of the hindered amine compound (C) and the amount of the ultraviolet absorber compound (D) increase. However, as these amounts increase, the amount of gas generated during molding tends to increase as well.

Since the thermoplastic resin composition according to the first aspect of the present invention specifies the total amount of the hindered amine compound (C) and the ultraviolet absorber compound (D), the amount of gas generated during molding can be suppressed. Specifically, an amount of gas adhering to a mold (gas adhesion amount) is preferably less than 0.30 mg, more preferably 0.28 mg or less, even more preferably 0.25 mg or less, and particularly preferably 0.20 mg or less, when the thermoplastic resin composition is molded into 50 pieces of molded product (2) each having a length of 100 mm, a width of 50 mm, and a thickness of 3 mm using an injection molding machine under conditions of a cylinder set temperature of 260° C., a mold temperature of 30° C., and a short shot condition with a resin filling amount reduced to about ⅔ of an internal volume of the mold. A smaller gas adhesion amount means less gas generation during molding. The gas adhesion amount is most preferably 0 mg. Using a gas adsorption plate installed on the mold, the gas adhesion amount is determined from the weight difference of the plate between before the start of molding and after 50 shots of molding.

Thus, the thermoplastic resin composition of the first aspect of the present invention not only shows excellent flowability and generates less amount of gas during molding, but also can be used to obtain a molded product having excellent weatherability.

<Molded Product>

The molded product according to the second aspect of the present invention can be obtained by molding the thermoplastic resin composition according to the first aspect of the present invention described above by a known molding method.

Examples of the molding method include an injection molding method, a press molding method, an extrusion molding method, a vacuum molding method, a blow molding method and the like.

Since the molded product according to the second aspect of the present invention uses the thermoplastic resin composition according to the first aspect of the present invention, the molded product is excellent in weatherability.

The molded product according to the second aspect of the present invention is suitable as interior and exterior parts for automobiles, parts for OA equipment, parts for home appliances, parts for medical equipment, parts for electronic equipment, building materials, daily necessities and the like. In particular, the molded product according to the second aspect of the present invention can be preferably used as an interior part and an exterior part for automobiles.

Examples of automobile interior parts include dashboards, instrument panels, seatbelt buckles, upper boxes, cup holders, door trims, door knobs, door pockets, door linings, pillar garnishes, consoles, console boxes, room mirrors, sun visors, center panels, ventilators, air conditioners, air conditioner panels, heater control panels, plate blades, valve shutters, louvers, ducts, meter panels, meter cases, meter visors, instrument panel upper garnishes, instrument panel lower garnishes, A/T indicators, on/off switches (slides, slide plates), switch bezels, grill front defrosters, grill side defrosters, lid clusters, masks for instrument lower covers (mask switches, mask radios, etc.), pockets (pocket decks, pocket cards, etc.), steering wheel horn pads, cup holders, switch parts, switch boxes, grips such as assist grips, handles, grab handle car navigation exterior parts, camera covers, camera monitoring systems, head-up displays, rear entertainment systems, glove boxes, glove box ratchets, accessory cases, ratchets on the lids of accessory cases, room mirrors, room lamps, armrests, speaker grills, navigation panels, overhead consoles, clock indicators, SOS switches, and the like.

Examples of automobile exterior parts include front grilles, wheel caps, bumpers, fenders, spoilers, garnishes, door mirrors, radiator grilles, rear combination lamps, headlamps, turn signals, grips on outside door handles, and the like.

Examples of parts for OA equipment include printers, fax machines, copiers, personal computers, projectors, and the like.

Examples of home appliance parts include recorder parts, TV parts, iron parts, hair dryer parts, rice cooker parts, microwave oven parts, gas stove parts, vacuum cleaner parts, dishwasher parts, air purifier parts, audio equipment parts, and parts for audio equipment (audio devices, laser disc (registered trademark) players, compact disc players, etc.), lighting equipment parts, refrigerator parts, air conditioner parts, and the like.

Examples of parts for medical devices include electronic thermometers, sphygmomanometers, blood glucose meters, electrocardiogram measuring devices, ultrasonic diagnostic devices, electronic endoscopes, and the like.

Examples of parts for electronic devices include mobile phone parts, tablet device parts, digital cameras, and the like.

Examples of building materials include fences, screens, gate posts, decks, garden furniture, carports, gable boards, wall pilasters, gutters, window frames, studs, various hose covers, exterior wall decorative materials, and the like.

Examples of daily necessities include bath lids, drainboards, buckets, duvet cases, shelf plates, shelve receivers, picture frames, trays, and toiletry products.

EXAMPLES

Hereinbelow, the present invention will be described in more detail with reference to Examples which, however, should not be construed as limiting the present invention. In the following Examples, "%" and "parts" are based on mass unless otherwise specified.

The methods for various measurements and evaluations and the components in the Examples are as described below.
[Measurements and Evaluations]
<Measurement of Mass Average Molecular Weight>

The mass average molecular weight (Mw) of the copolymer (A) was measured using a gel permeation chromatography apparatus (GPC apparatus) manufactured by Tosoh Corporation. In the molecular weight measurement, a polymer sample was dissolved using tetrahydrofuran (THF) as a solvent, and the resulting polymer sample was introduced into the GPC apparatus. The mass average molecular weight was determined in terms of the polystyrene-equivalent molecular weight of a polymer sample measured using a calibration curve obtained in advance with respect to standard polystyrene having a known molecular weight.
<Measurement of Glass Transition Temperature>

The differential scanning calorimetry (DSC) was used to determine the glass transition temperature observed when the temperature was raised from 35° C. to 250° C. at a heating rate of 10° C./min in a nitrogen atmosphere, lowered to 35° C., and then raised to 250° C. again.
<Measurement of Volume Average Particle Size>

The volume average particle size of the rubber polymer (b1) dispersed in an aqueous dispersion was measured using Microtrac ("Nanotrack 150" manufactured by Nikkiso Co., Ltd.) and ion-exchanged water as measurement solvent.
<Measurement of Graft Ratio>

1 g of the graft copolymer (B) was added to 80 mL of acetone, heat-refluxed at 65 to 70° C. for 3 hours, and the resulting acetone suspension was centrifuged with a centrifuge ("CR21E" manufactured by Koki Holdings Co., Ltd.) at 14,000 rpm for 30 minutes to separate the suspension into a precipitate (acetone-insoluble fraction) and an acetone solution (acetone-soluble fraction). Next, the acetone-insoluble fraction was dried, the mass of the dried acetone-insoluble fraction was measured, and the graft ratio of the graft copolymer (B) was determined by the following formula (1). In the formula (1), Y is the mass (g) of the acetone insoluble fraction after drying. X is the total mass (g) of the graft copolymer (B) used for determining Y. The rubber fraction is the amount ratio of the rubber polymer (b1) in the graft copolymer (B) (solid content concentration in the aqueous dispersion).

$$\text{Graft ratio (\%)} = \{(Y - X \times \text{rubber fraction})/(X \times \text{rubber fraction})\} \times 100 \quad (1)$$

<Measurement of Maximum Absorption Wavelength>

The ultraviolet absorber compound (D) was dissolved in 1 L of trichloromethane, the absorption spectrum in the wavelength region of 200 to 450 nm was measured with respect to the obtained solution by an ultraviolet-visible spectrophotometer, and a wavelength at which the absorbance was maximized was determined as the maximum absorption wavelength.
<Evaluation of Appearance>

Using an injection molding machine ("IS55FP-1.5A" manufactured by Japan Steel Works, Ltd.), pellets of the thermoplastic resin composition were molded into a test piece (molded product 1) having a length of 100 mm, a width of 100 mm and a thickness of 3 mm under conditions of a cylinder set temperature of 260° C. and a mold temperature of 30° C.

Using a digital variable angle gloss meter ("UGV-5D" manufactured by Suga Test Instruments Co., Ltd.), the gloss (Gs) of the surface of the molded product 1 at an incident angle of 60° as prescribed in JIS Z8741 was measured. The higher the gloss, the better the appearance of the molded product.
<Evaluation of Color Development>

The color tone (L*) of the molded product 1 was measured using an SCE type colorimeter ("CM-508D" manufactured by Konica Minolta Japan Co., Ltd.). The smaller the value of L*, the deeper the blackness of the molded product and the better the black color development.
<Evaluation of Weatherability>

For the molded product 1, a weatherability test was implemented by exposing the molded product 1 to environment with a temperature of 63° C. and a cycle condition of 60 minutes (rainfall: 12 minutes) for 2000 hours using "WEL-SUN-DCH type Sunshine Super Long Life Weather Meter" manufactured by Suga Test Instruments Co., Ltd. The discoloration degree (ΔE) of the molded product 1 before and after the weatherability test was measured using the colorimeter. The smaller the value of ΔE, the better the weatherability.
<Evaluation of Flowability>

The melt volume rate (MVR) of the pelletized thermoplastic resin composition was measured at 220° C. under a load of 98 N (10 kg) according to the ISO 1133 standard. The higher the MVR, the better the flowability.

<Evaluation of Gas Generation>

Using an injection molding machine ("IS55FP-1.5A" manufactured by Toshiba Machine Co., Ltd.), pellets of the thermoplastic resin composition were molded into 50 test pieces (molded product 2) each having a length of 100 mm, a width of 50 mm, and a thickness of 3 mm under conditions of a cylinder set temperature of 260° C., a mold temperature of 30° C., and a short shot condition with a resin filling amount reduced to about ⅔ of an internal volume of the mold. Using a gas adsorption plate installed on the mold, the amount of gas adhered to the mold (gas adhesion amount) was determined from the weight difference of the plate between before the start of molding and after 50 shots of molding, i.e., after molding 50 test pieces. A smaller gas adhesion amount means less gas generation during molding.

<Evaluation of Heat Resistance>

Using an injection molding machine ("IS55FP-1.5A" manufactured by Toshiba Machine Co., Ltd.), pellets of the thermoplastic resin composition were molded into a test piece (molded product 3) having a length of 80 mm, a width of 10 mm and a thickness of 4 mm under conditions of a cylinder set temperature of 260° C. and a mold temperature of 30° C.

According to ISO 75, using an HDT testing machine ("6A-2" manufactured by Toyo Seiki Seisaku-sho, Ltd.), the deflection temperature under load (HDT) of the molded product 3 was measured under a load of 1.83 MPa and with a flat width (4 mm thickness). The higher the value of HDT, the better the heat resistance.

[Copolymer (A)]

<Production of Copolymer (A-1)>

With 100 parts of a vinyl monomer mixture (m1) composed of 76 parts of methyl methacrylate and 24 parts of styrene were mixed, in advance, 0.1 part of t-butyl peroxypivalate ("Perbutyl PV" manufactured by NOF CORPORATION, 10-hour half-life temperature: 54.6° C.), 0.05 parts of t-butylperoxy-2-ethyl hexanoate ("Perbutyl O" manufactured by NOF CORPORATION, 10-hour half-life temperature: 72.1° C.), 0.05 parts of 1,1-di(t-hexylperoxy)cyclohexane ("Perhexa HC" manufactured by NOF CORPORATION, 10-hour half-life temperature: 87.1° C.), 0.6 parts of t-dodecyl mercaptan (manufactured by Alchema Ltd.), 0.2 parts of α-methylstyrene dimer (manufactured by Mitsui Chemicals Inc.), whereafter the resulting was charged into a 20 L pressure resistant reaction tank equipped with a stirrer together with a mixture of 200 parts of pure water with 0.5 parts of tricalcium phosphate (manufactured by Ube Material Industries Ltd.) and 0.003 parts of potassium alkenyl succinate ("LATEMUL DSK" manufactured by Kao Corporation), and polymerization was initiated from 40° C. The polymerization reaction was implemented with a heating rate of 5 to 10° C./hr for 9 hours, and terminated when the temperature reached 120° C. After cooling, washing, filtering, and drying, a copolymer (A-1) was obtained as polymer beads.

The mass average molecular weight and the glass transition temperature of the obtained copolymer (A-1) were measured. The results are shown in Table 1.

<Production of Copolymers (A-2) to (A-5)>

The copolymers (A-2) to (A-5) were produced in the same manner as for the copolymer (A-1) except that the composition of the vinyl monomer mixture (m1) was varied as shown in Table 1.

The mass average molecular weight and the glass transition temperature of each of the obtained copolymers (A-2) to (A-5) were measured. The results are shown in Table 1.

TABLE 1

| Copolymer (A) | | A-1 | A-2 | A-3 | A-4 | A-5 |
|---|---|---|---|---|---|---|
| Vinyl monomer mixture (m1) [Parts] | Methyl methacrylate | 76 | 76 | 74 | 100 | 0 |
| | Styrene | 24 | 16 | 6 | 0 | 73 |
| | Acrylonitrile | 0 | 0 | 0 | 0 | 27 |
| | N-phenylmaleimide | 0 | 8 | 20 | 0 | 0 |
| Mass average molecular weight | | 91000 | 90500 | 120000 | 900000 | 95000 |
| Glass transition temperature [° C.] | | 110 | 120 | 140 | 102 | 115 |

[Graft Copolymer (B)]

<Production of Graft Copolymer (B-1)>

A mixture of 0.27 parts of dipotassium alkenyl succinate, 175 parts of ion-exchanged water, 50 parts of n-butyl acrylate, 0.16 parts of allyl methacrylate, 0.08 parts of 1,3-butylene glycol dimethacrylate, and 0.1 part of t-butyl hydroperoxide was charged into a reactor. The inside of the reactor was purged with nitrogen by passing a nitrogen stream through the reactor, and the temperature was raised to 60° C. When the internal temperature reached 50° C., an aqueous solution composed of 0.00015 parts of ferrous sulfate, 0.00045 parts of disodium ethylenediaminetetraacetate, 0.24 parts of longalit, and 5 parts of ion-exchanged water were added to initiate polymerization, and the internal temperature was raised to 75° C. Further, this state was maintained for 1 hour to obtain a rubber polymer (b1-1) having a volume average particle diameter of 0.20 μm.

While maintaining the internal temperature of the reactor at 75° C., an aqueous solution composed of 0.15 parts of longalit, 0.65 parts of dipotassium alkenyl succinate, and 10 parts of ion-exchanged water were added to 50 parts (as solid content) of the rubbery polymer (b1-1), and then a mixed solution composed of 6.3 parts of acrylonitrile, 18.7 parts of styrene, and 0.11 parts of t-butyl hydroperoxide was added dropwise over 1 hour to carry out graft polymerization. Five minutes after the completion of the dropwise addition, an aqueous solution composed of 0.001 part of ferrous sulfate, 0.003 parts of disodium ethylenediaminetetraacetate, 0.15 parts of longalit, and 5 parts of ion-exchanged water was added, and then a mixed solution composed of 6.3 parts of acrylonitrile, 18.7 parts of styrene, 0.19 parts of t-butyl hydroperoxide, and 0.014 parts of n-octyl mercaptan was added dropwise over 1 hour to carry out graft polymerization. After completion of the dropwise addition, the internal temperature was maintained at 75° C. for 10 minutes, and then cooled. When the internal temperature reached 60° C., an aqueous solution prepared by dissolving 0.2 parts of an antioxidant ("Antage W500" manufactured by Yoshitomi Pharmaceutical Industries, Ltd.) and 0.2 parts of dipotassium alkenyl succinate in 5 parts of ion-exchanged water was added. Next, an aqueous dispersion of the reaction product was coagulated with an aqueous sulfuric acid solution, washed with water, and then dried to obtain a graft copolymer (B-1). The graft ratio of the graft copolymer (B-1) was 40%.

[Hindered Amine Compound (C)]

The following compounds were used as the hindered amine compound (C).

C-1: Bis(2,2,6,6-tetramethyl-4-piperidyl) sebacate ("ADEKA STAB LA-77Y" manufactured by ADEKA Corporation, molecular weight: 481).

C-2: Tetrakis(2,2,6,6-tetramethyl-4-piperidyl)-1,2,3,4-butanetetracarboxylate, ("ADEKA STAB LA-57" manufactured by ADEKA Corporation, molecular weight: 791).

C-3: Reaction product of 1,2,3,4-butanetetracarboxylic acid, tetramethyl ester, 1,2,2,6,6-pentamethyl-4-piperidinol, and β,β,β',β'-tetramethyl-2,4,8,10-tetraoxaspiro[5.5]undecane-3,9-diethanol ("ADEKA STAB LA-63P", manufactured by ADEKA Corporation, molecular weight: 2000).

[Ultraviolet Absorber Compound (D)]

The following compounds were used as the ultraviolet absorber compound (D).

D-1: 2-(4,6-diphenyl-1,3,5-triazine-2-yl)-5[2-(2-ethylhexanoyloxy)ethoxy]phenol ("ADEKA STAB LA-46" manufactured by ADEKA Corporation, maximum absorption wavelength: 280 nm).

D-2: 2-[4,6-bis(2,4-dimethylphenyl)-1,3,5-triazine-2-yl]-5-(octyloxy)-phenol ("Eusorb UV-164" manufactured by EUTEC CHEMICAL, maximum absorption wavelength: 290 nm).

D-3: 2-(4,6-diphenyl-1,3,5-triazine-2-yl)-5-(hexyloxy) phenol ("Tinuvin 1577" manufactured by BASF, maximum absorption wavelength: 270 nm).

D-4: 2-[4,6-bis(1,1'-biphenyl-4-yl)-1,3,5-triazine-2-yl]-5[2-(2-ethylhexyl)oxy)] phenol ("Tinuvin 1600" manufactured by BASF, maximum absorption wavelength: 320 nm).

D-5: [2-hydroxy-4-(octyloxy)phenyl](phenyl) methanone ("ADEKA STAB 1413" manufactured by ADEKA Corporation, maximum absorption wavelength: 290 nm).

[Examples 1 to 10, Comparative Examples 1 to 8]

The copolymers (A), graft copolymers (B), hindered amine compounds (C) and ultraviolet absorber compounds (D), the types and amounts (part) of which are shown in Tables 2 and 3, 1.0 part of carbon black ("#2900B" manufactured by Mitsubishi Chemical Corporation) as a pigment and 0.4 parts of ethylene bisstearylamide (manufactured by Kao Corporation) as a lubricant were mixed using a Henschel mixer. The obtained mixture was melt-kneaded at 250° C. using a screw extruder ("TEX-30α twin-screw extruder" manufactured by The Japan Steel Works, Ltd.). The melt-kneaded product thus obtained was cooled and then pelletized using a pelletizer to obtain pellets of the thermoplastic resin composition.

The flowability of the obtained thermoplastic resin composition was evaluated. In addition, a molded product was produced using the obtained thermoplastic resin composition, and the appearance, color development, weatherability, gas generation and heat resistance were evaluated. The results are shown in Tables 2 and 3.

TABLE 2

| | | | Examples | | | | | | | | | |
|---|---|---|---|---|---|---|---|---|---|---|---|---|
| | | | 1 | 2 | 3 | 4 | 5 | 6 | 7 | 8 | 9 | 10 |
| Blending ratio [Part] | Copolymer (A) | A-1 | 100 | 0 | 100 | 100 | 100 | 100 | 100 | 100 | 60 | 100 |
| | | A-2 | 0 | 100 | 0 | 0 | 0 | 0 | 0 | 0 | 0 | 0 |
| | Graft copolymer (B) | B-1 | 0 | 0 | 0 | 0 | 0 | 0 | 0 | 0 | 40 | 0 |
| | Hindered amine compound (C) | C-1 | 1.0 | 1.0 | 0.4 | 1.8 | 0.4 | 0 | 1.0 | 1.0 | 1.0 | 1.0 |
| | | C-2 | 0 | 0 | 0 | 0 | 0 | 1.0 | 0 | 0 | 0 | 0 |
| | Ultraviolet absorber compound (D) | D-1 | 0.4 | 0.4 | 0.1 | 0.2 | 1.6 | 0.4 | 0 | 0 | 0.4 | 0 |
| | | D-2 | 0 | 0 | 0 | 0 | 0 | 0 | 0.4 | 0 | 0 | 0 |
| | | D-3 | 0 | 0 | 0 | 0 | 0 | 0 | 0 | 0.4 | 0 | 0 |
| | | D-5 | 0 | 0 | 0 | 0 | 0 | 0 | 0 | 0 | 0 | 0.4 |
| | Optional component | Carbon black | 1.0 | 1.0 | 1.0 | 1.0 | 1.0 | 1.0 | 1.0 | 1.0 | 1.0 | 1.0 |
| | | Ethylenebisstearamide | 0.4 | 0.4 | 0.4 | 0.4 | 0.4 | 0.4 | 0.4 | 0.4 | 0.4 | 0.4 |
| Evaluation | Appearance | Gloss [%] | 95 | 95 | 93 | 95 | 92 | 95 | 94 | 95 | 93 | 92 |
| | Color development | Color tone (L*) | 3.3 | 3.4 | 3.6 | 3.7 | 3.7 | 3.5 | 3.5 | 3.6 | 3.2 | 3.4 |
| | Weatherability | Discoloration degree (ΔE) | 2.5 | 2.4 | 2.8 | 2.1 | 2.1 | 2.5 | 2.6 | 2.4 | 2.8 | 2.9 |
| | Flowability | MVR [cm$^3$/10 min] | 18 | 15 | 18 | 19 | 19 | 18 | 19 | 19 | 12 | 17 |
| | Gas generation | Gas adhesion [mg] | 0.20 | 0.19 | 0.10 | 0.28 | 0.24 | 0.18 | 0.20 | 0.21 | 0.23 | 0.23 |
| | Heat resistance | HDT [° C.] | 74 | 95 | 74 | 74 | 75 | 75 | 75 | 74 | 76 | 74 |

TABLE 3

| | | | Comparative Examples | | | | | | | |
|---|---|---|---|---|---|---|---|---|---|---|
| | | | 1 | 2 | 3 | 4 | 5 | 6 | 7 | 8 |
| Blending ratio [Part] | Copolymer (A) | A-1 | 0 | 0 | 0 | 100 | 100 | 100 | 100 | 100 |
| | | A-3 | 100 | 0 | 0 | 0 | 0 | 0 | 0 | 0 |
| | | A-4 | 0 | 100 | 0 | 0 | 0 | 0 | 0 | 0 |
| | | A-5 | 0 | 0 | 100 | 0 | 0 | 0 | 0 | 0 |
| | Hindered amine compound (C) | C-1 | 1.0 | 1.0 | 1.0 | 2.0 | 0 | 1.8 | 0 | 1.0 |
| | | C-3 | 0 | 0 | 0 | 0 | 0 | 0 | 1.0 | 0 |
| | Ultraviolet absorber compound (D) | D-1 | 0.4 | 0.4 | 0.4 | 0 | 2.0 | 0.4 | 0.4 | 0 |
| | | D-4 | 0 | 0 | 0 | 0 | 0 | 0 | 0 | 0.4 |
| | Optional component | Carbon black | 1.0 | 1.0 | 1.0 | 1.0 | 1.0 | 1.0 | 1.0 | 1.0 |
| | | Ethylenebisstearamide | 0.4 | 0.4 | 0.4 | 0.4 | 0.4 | 0.4 | 0.4 | 0.4 |

TABLE 3-continued

|  |  |  | Comparative Examples | | | | | | | |
|---|---|---|---|---|---|---|---|---|---|---|
|  |  |  | 1 | 2 | 3 | 4 | 5 | 6 | 7 | 8 |
| Evaluation | Appearance | Gloss [%] | 94 | 93 | 95 | 93 | 93 | 95 | 92 | 91 |
|  | Color development | Color tone (L*) | 3.7 | 4.1 | 2.9 | 3.7 | 3.7 | 4.4 | 3.4 | 3.6 |
|  | Weatherability | Discoloration degree (ΔE) | 2.8 | 2.8 | 16.4 | 6.1 | 8.3 | 2.0 | 9.1 | 8.5 |
|  | Flowability | MVR [cm³/10 min] | 3.5 | 6.1 | 19 | 16 | 16 | 17 | 15 | 15 |
|  | Gas generation | Gas adhesion [mg] | 0.20 | 0.19 | 0.21 | 0.40 | 0.30 | 0.46 | 0.15 | 0.24 |
|  | Heat resistance | HDT [° C.] | 99 | 79 | 79 | 75 | 75 | 75 | 75 | 74 |

As shown in Table 2, the thermoplastic resin compositions of the Examples were excellent in flowability. In addition, when the thermoplastic resin compositions of the Example were molded, the thermoplastic resin compositions not only generated less amount of gas during molding, but also were able to provide molded products having excellent appearance, color development and weatherability. In particular, from the thermoplastic resin composition of Example 2 using the copolymer (A-2) containing the N-substituted maleimide monomer unit, a molded product having excellent heat resistance as well could be obtained.

On the other hand, as shown in Table 3, the thermoplastic resin composition and the molded product thereof obtained in each Comparative Example were inferior in the flowability, weatherability, and/or gas generation.

Specifically, in Comparative Examples 1 and 2 using the copolymers (A-3) and (A-4) obtained by polymerizing a vinyl monomer mixture (m1) containing an aromatic vinyl monomer in an amount of not more than 6% by mass, the flowability of the thermoplastic resin compositions was inferior.

In Comparative Example 3 using the copolymer (A-5) obtained by polymerizing a vinyl monomer mixture (m1) containing no (meth)acrylic acid ester monomer, the weatherability of the molded product was inferior.

The thermoplastic resin compositions of Comparative Examples 4 and 5 containing neither the hindered amine compound (C) nor the ultraviolet absorber compound (D) were inferior in the weatherability of the obtained molded products. In addition, gas generation was liable to occur during molding.

The thermoplastic resin composition of Comparative Example 6 in which the sum of amounts of the hindered amine compound (C) and the ultraviolet absorber compound (D) was large was liable to generate gas during molding.

In Comparative Example 7 using the hindered amine compound (C-3) having a molecular weight of 2,000, the weatherability of the molded product was inferior.

In Comparative Example 8 using the ultraviolet absorber compound (D-4) having a maximum absorption wavelength at 320 nm, the weatherability of the molded product was inferior.

INDUSTRIAL APPLICABILITY

The molded product obtained by molding the thermoplastic resin composition of the present invention has excellent weatherability. The molded product of the present invention has extremely high utility value as interior and exterior parts, OA equipment parts, home appliance parts, medical equipment parts, electronic equipment parts, building materials, daily necessities and the like.

The invention claimed is:

1. A thermoplastic resin composition comprising:
a methacrylate copolymer (A) obtained by polymerizing a vinyl monomer mixture (m1) containing a methyl methacrylate monomer, an aromatic vinyl monomer, and optionally other monomers which are different from the methyl methacrylate monomer and the aromatic vinyl monomer;
a hindered amine compound (C) having a molecular weight of 200 to 1800; and
an ultraviolet absorber compound (D) having a maximum absorption wavelength at 250 to 300 nm,
wherein:
the thermoplastic resin composition does not include a graft copolymer (B) which is obtained by graft-polymerizing 20 to 80% by mass of a vinyl monomer mixture (m2) in the presence of 20 to 80% by mass of a rubber polymer (b1) (with the proviso that a sum of the total amounts of the rubber (b1) and the vinyl monomer mixture (m2) is 100% by mass), and has a graft ratio of 10 to 150%, wherein the rubber polymer (b1) is at least one selected from the group consisting of a diene rubber polymer, an acrylic rubber polymer, an olefin rubber polymer, and a silicone rubber polymer, and the vinyl monomer mixture (m2) comprises 65 to 82% by mass of an aromatic vinyl monomer and 18 to 35% by mass of a vinyl cyanide monomer, based on the total mass of the vinyl monomer mixture (m2);
the methyl methacrylate monomer is present in an amount of 70% by mass or more and less than 78% by mass, the aromatic vinyl monomer is present in an amount of 12 to 30% by mass, and the other monomers are optionally present in an amount of 10% by mass or less, each based on a total mass of the vinyl monomer mixture (m1),
the ultraviolet absorber compound (D) is 2-(4,6-diphenyl-1,3,5-triazine-2-yl)-5 [2-(2-ethylhexanoyloxy) ethoxy] phenol,
the hindered amine compound (C) is bis(2,2,6,6-tetramethyl-4-piperidyl) sebacate, and
the hindered amine compound (C) is present in an amount of 0.4 to 1.0 parts by mass, the ultraviolet absorber compound (D) is present in an amount of 0.2 to 0.5 parts by mass, and a sum of the amounts of the hindered amine compound (C) and the ultraviolet absorber compound (D) is 0.5 to 1.5 parts by mass, each relative to 100 parts by mass of the methacrylate copolymer (A), and
the thermoplastic resin composition shows a color tone (L*) of 3.2 to 3.4 measured using an SCE type colorimeter with respect to a molded product of the thermoplastic resin composition, wherein the molded product has a length of 100 mm, a width of 100 mm and a thickness of 3 mm and is obtained by molding under conditions of a cylinder set temperature of 260° C. and a mold temperature of 30° C.

2. The thermoplastic resin composition according to claim 1, wherein the vinyl monomer mixture (m1) further comprises an N-substituted maleimide monomer, and the N-substituted maleimide monomer is present in an amount of 1% by mass or more and less than 9% by mass, based on a total mass of the vinyl monomer mixture (m1).

3. A molded product using the thermoplastic resin composition of claim 1.

4. The thermoplastic resin composition according to claim 1, wherein the sum of the amounts of the hindered amine compound (C) and the ultraviolet absorber compound (D) is 0.6 to 1.5 parts by mass, relative to 100 parts by mass of the methacrylate copolymer (A).

* * * * *